June 13, 1944.    J. H. GERSTENMAIER    2,351,329
METHOD AND APPARATUS FOR MAKING RUBBER TORSION UNITS
Filed Dec. 12, 1941    2 Sheets-Sheet 1
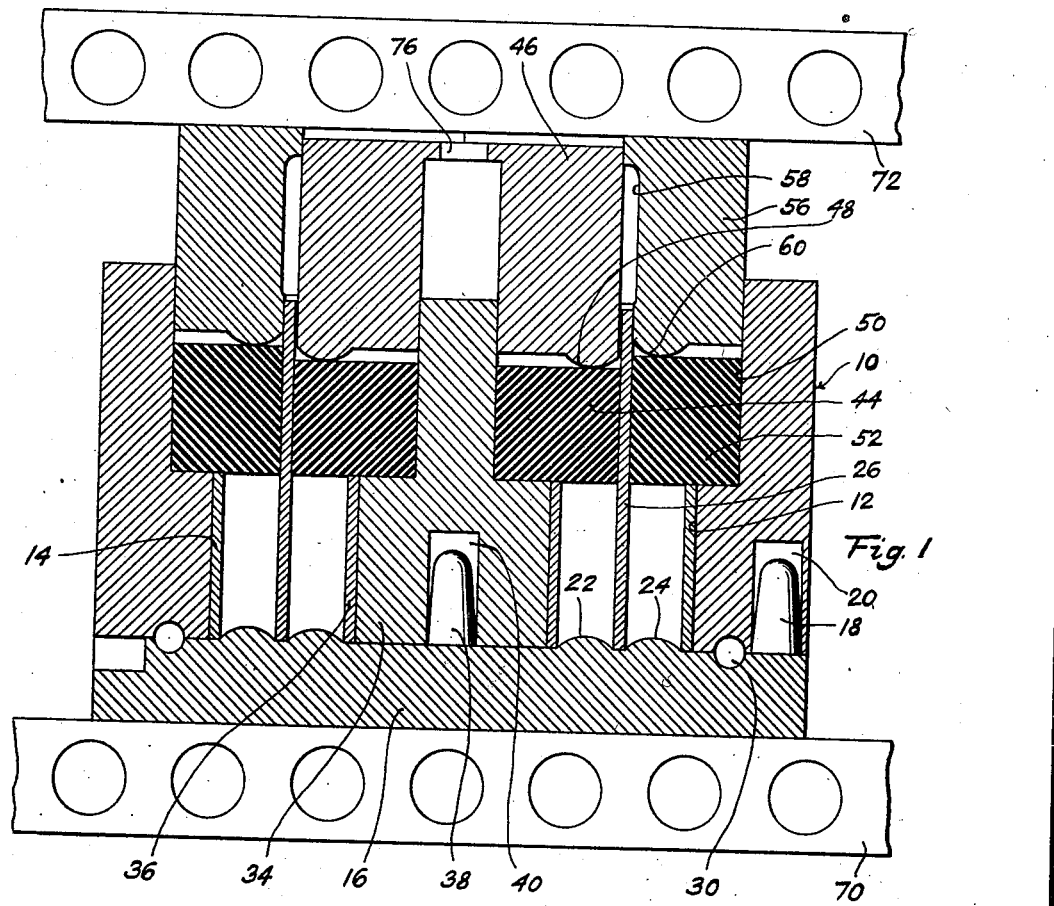
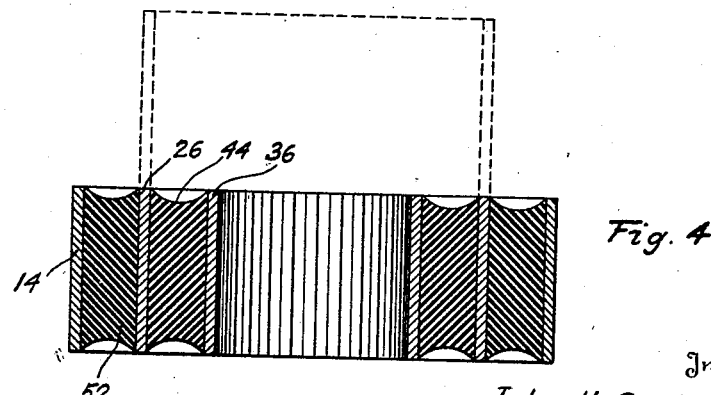
Inventor
John H. Gerstenmaier
By R. H. Waters
Attorney June 13, 1944. J. H. GERSTENMAIER 2,351,329
METHOD AND APPARATUS FOR MAKING RUBBER TORSION UNITS
Filed Dec. 12, 1941 2 Sheets-Sheet 2
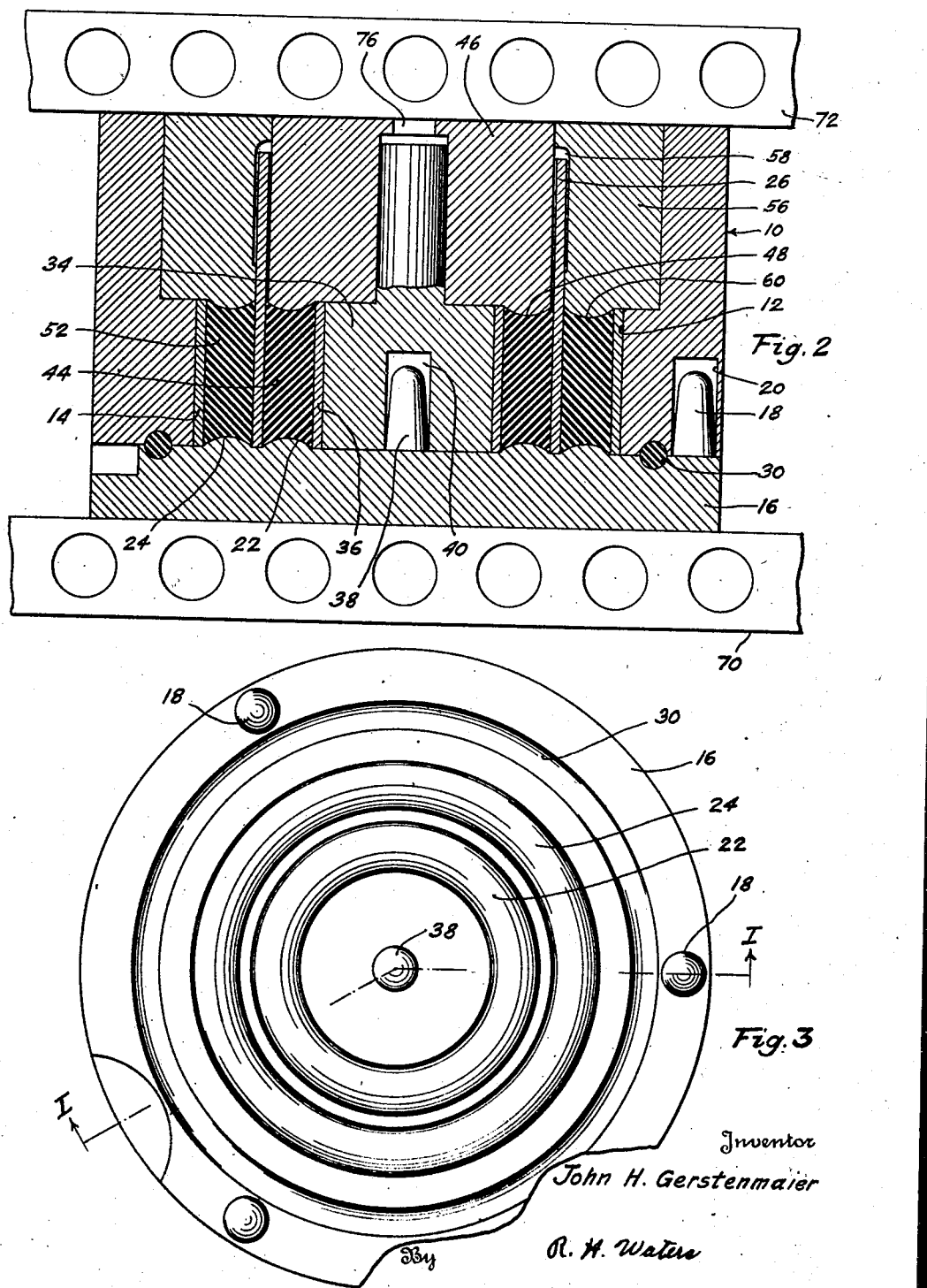
Inventor
John H. Gerstenmaier
By R. H. Waters
Attorney Patented June 13, 1944

2,351,329

UNITED STATES PATENT OFFICE 2,351,329

METHOD AND APPARATUS FOR MAKING RUBBER TORSION UNITS

John H. Gerstenmaier, St. Marys, Ohio, assignor to Wingfoot Corporation, Akron, Ohio, a corporation of Delaware Application December 12, 1941, Serial No. 422,694

10 Claims. (Cl. 18—17)

This invention relates to methods and apparatus for molding rubber articles, and, more particularly, is concerned with improved means and methods for vulcanizing rubber torsion units and the like.

Heretofore, in the manufacture of rubber torsion bushings or torsion units, the rubber generally has been extruded and partially cured or fully cured before being inserted between the respective sleeves of the bushings. Sometimes the rubber has been vulcanized to one sleeve and made of a greater outside diameter than the other sleeves, and then the inner sleeve has been forced into the outer sleeve to compress the rubber therebetween, leaving an unbonded relation between the bushing and the outer sleeve. A rubber torsion unit or bushing made in this manner is subject to slippage between the rubber and the metal sleeves when carrying a high torque load. Also, it has been found that the methods described have resulted in air pockets which prevent efficient and complete contact of the rubber with the metal sleeves.

The same disadvantages have been experienced in connection with those bushings or torsion units in which rubber rings are first formed and partially or wholly vulcanized and then forced into the space between the sleeves. The difficulties mentioned are further complicated during the manufacture of a rubber torsion unit comprising more than one body of rubber, for example, a torsion unit including three concentric metal sleeves with the inner and the intermediate sleeves being separated by rubber having a different degree of hardness from the rubber separating the intermediate and the outer metal sleeve.

It is the general object of my invention to avoid and overcome the foregoing and other difficulties of and objections to prior known methods and apparatus by the provision of improved means and methods for vulcanizing rubber torsion units or bushings.

Another object of my invention is the provision of an improved, relatively-inexpensive, easily-operated apparatus for vulcanizing rubber torsion units, and particularly torsion units having a plurality of kinds of rubber therein and with the apparatus functioning to vulcanize the rubber directly to the metal sleeves.

Another object of my invention is to provide a rapid, easily-performed, relatively-inexpensive method for facilitating the molding and vulcanization of rubber torsion units and the like.

Another object of my invention is the provision of an improved method for making rubber torsion units having more than two concentric metal sleeves separated by bodies of rubber of different composition and with the rubber vulcanized directly to the metal sleeves.

The foregoing and other objects of my invention are achieved by the provision of apparatus including means for supporting a plurality of laterally spaced, concentrically arranged sleeves, means for forcing rubber between certain areas of the sleeves, and means for vulcanizing the rubber in position between the sleeves. More particularly, the apparatus of my invention may include a second means for forcing another kind of rubber between other areas of the sleeves, and, specifically, a mold, a core removably carried at the center of the mold, a plunger slidably carried by the core, a second plunger slidably carried between the first-named plunger and the mold, and with the mold and core being formed with recesses and receiving separate bodies of rubber.

The method of my invention includes the steps of positioning an outer metal sleeve concentric to an inner metal sleeve, positioning at least one metal sleeve of intermediate diameter and greater length than the first-named sleeves between the first-named sleeves and so that the intermediate sleeve extends longitudinally beyond the first-named sleeves, engaging a body of rubber against the inner surface of the intermediate sleeve, engaging a body of rubber against the outer surface of the intermediate sleeve, forcing the rubber bodies under heat and pressure to positions between and in engagement with the several sleeves, vulcanizing the rubber bodies to the sleeves, and cutting off that portion of the intermediate sleeve extending longitudinally beyond the inner and outer sleeves.

For a better understanding of my invention reference should be had to the accompanying drawings, wherein:

Fig. 1 is a vertical, cross-sectional view through a mold assembly in the initial position and incorporating the principles of my invention and taken substantially on line I—I of Fig. 3;

Fig. 2 is a view similar to Fig. 1, but illustrating the mold assembly in the closed or vulcanizing position;

Fig. 3 is a plan view of the base of the mold assembly; and

Fig. 4 is a diametrical cross-sectional view of a rubber torsion unit constructed with the apparatus and by the method of my invention.

Referring to Figs. 1, 2 and 3 of the drawings, the numeral 10 indicates generally a mold having an opening or recess 12 adapted to receive and closely support and position an outer metal sleeve 14. The mold 10 is usually made from a single piece of metal, but I particularly contemplate that the mold may be diametrically split if this found more convenient in certain vulcanizing operations.

The mold 10 is provided with a base 16 which is generally made removable from the mold 10, but which can be quickly aligned with the mold, as, for example, by the provision of a plurality of dowel pins 18 secured to the base 16 at circumferentially spaced points, and received within recesses 20 formed in the bottom of the mold 10. The base 16 is generally provided with concentrically positioned annular ribs 22 and 24, with the rib 24 engaging with the inner periphery of the end of the outer metal sleeve 14 to still further align the sleeve and the mold assembly together. The inside rib 22 is spaced radially inwardly from the outer rib 24 so as to form a groove between the ribs, which groove is adapted to receive and position an intermediate metal sleeve, indicated by the numeral 26. The intermediate metal sleeve 26 is positioned concentrically of the outer metal sleeve 14, but is spaced laterally therefrom in the manner clearly illustrated in the drawings. The base 16 of the mold assembly may also be formed with clearance spaces 30 into which surplus rubber may flow from the mold cavity, and to facilitate this flow of rubber, small grooves or other clearance spaces (not shown) may be provided between the bottom of the mold 10 and the upper surface of the base 16.

Mounted, generally in a removable manner at the center of the base 16, is a core member 34 which is adapted to removably receive and closely support an inner metal sleeve 36 forming a part of the torsion unit. The core member 34 may be releasably mounted on the base 16 by the provision of a dowel pin 38 on the base which is received within a complementary recess 40 formed at the lower end of the core member. The upper end of the core member 34 is reduced in diameter so as to provide a recess which is adapted to receive a body of rubber 44, with the body being positioned between the intermediate metal sleeve 26 and the reduced portion of the core member 34. Slidably mounted on the reduced portion of the core member 34 is a plunger 46 which is of an over-all diameter which will permit it to slide closely within the intermediate sleeve 26. A rib 48 may be formed upon the bottom outer periphery of the plunger 46, which rib is similar to the rib 22 and which is adapted to cooperate therewith to form concavities in the end of the rubber body positioned between the inner sleeve 36 and the intermediate sleeve 26 during the vulcanizing operation, and in the manner illustrated in Fig. 2 of the drawings.

The mold member 10 is provided with a recessed portion 50 which is adapted to receive a body of rubber 52, with the rubber engaging with the outer periphery of the intermediate sleeve 26. Slidably positioned between the mold 10 and the plunger 46 is a second plunger 56 which is formed with a counterbore 58 adapted to receive the upper end of the intermediate sleeve 26. An annular rib 60 may be provided upon the inner periphery of the bottom of the plunger 56, which rib cooperates with the rib 24 to form concavities in the ends of the rubber body vulcanized between the intermediate sleeve 26 and the outer sleeve 14, and in the manner illustrated in Fig. 2 of the drawings. The second plunger 56 is conveniently made in a plurality of parts, and this usually takes the form of two parts formed by a diametric split of the plunger.

From the drawings it will be seen that the intermediate sleeve 26 is of considerably greater length than the sleeves 14 and 36, and extends longitudinally above the inner and outer sleeves in the manner clearly illustrated in the drawings. This use of an intermediate sleeve of extra length facilitates, in the combination of parts described, the use of rubbers of different degree of stiffness in the torsion unit. For example, the rubber body 44 may be of a composition having quite different spring characteristics than the rubber body 52, so that in the torsion unit produced one of the rubber bodies will absorb all primary stresses, both in torsion or in radial thrust, and the second rubber body will not come into play until the unit or bushing is subjected to considerably higher stresses.

In the use of the apparatus, and in accordance with the practice of the method of my invention, the various parts of the mold assembly are assembled together in the relation shown in Fig. 1 of the drawings, and usually bodies of rubber of different characteristics are positioned to the inside and to the outside of the intermediate sleeve 26. The rubber bodies ordinarily are made up from a plurality of layers of rubber wound to ring-shape and cut into short lengths, or the rubber bodies may be made up from an extruded section of rubber cut to proper length, formed into a circle and butt-spliced together at the ends. The metal sleeves 14, 26 and 36 are generally made of steel or other metal and are suitably brass-plated and cemented to facilitate the direct and positive vulcanization of the rubber bodies thereto. Usually, the inner periphery of the inner metal sleeve 36 is appropriately corrugated, grooved, or ribbed to facilitate the attachment of a shaft or other member thereto, and the outer periphery of the outer sleeve 14 may be similarly formed for the attachment of a housing thereto.

With the parts in the assembled relation shown in Fig. 1 of the drawings, the mold assembly is positioned between the platens 70 and 72 of a press, and the platens may be appropriately recessed for the reception of heating fluid such as steam. The platens are then moved together under pressure and move the plungers 46 and 56 down into high-pressure relationship with the rubber bodies 44 and 52 to force the rubber bodies down between the several sleeves. The flow of the rubber bodies is facilitated by the application of heat through the mold assembly from the platens, or the heat may be supplied in other ways, as, for example, by placing the mold assemblies in a pot heater, steam jacket, or by appropriately recessing the wall of the mold 10 if sufficient heat is not obtained from the platens, and all in a manner that will be well understood by those skilled in the art. The movement together of the platens 70 and 72 is continued until the mold assembly takes the position shown in Fig. 2, after which further movement together of the platens is prevented. The continued application of heat to the assembly and in the position shown in Fig. 2 causes the rubber of the several bodies to be vulcanized in very positive engagement between the various sleeves, and any excess of rubber flows out through the clearances 30.

After the vulcanizing operation the platens are moved apart and the mold assembly is removed from between the platens, and the vulcanized torsion unit is stripped from the mold assembly, usually by first removing the base, then stripping out the core member 34 through the suitable opening 76 in the top of the plunger 46, followed by the stripping of the inner plunger 46 and the stripping of the mold 10.

The finished torsion unit is illustrated in Fig. 4 and includes the inner metal sleeve 36, the intermediate metal sleeve 26 with the interposed body of rubber 44 vulcanized to and between the sleeves, the outer metal sleeve 14 and the body of rubber 52 vulcanized to and between the outer metal sleeve and the intermediate sleeve. The longitudinal extension of the intermediate sleeve 26, illustrated in dotted lines in Fig. 4, is cut off after the vulcanizing operation so that the intermediate sleeve has a length substantially equal to the length of the remaining sleeves of the assembly.

From the foregoing it will be recognized that the various objects of my invention have been achieved by the provision of a relatively simple method and apparatus for facilitating the vulcanization of torsion units, bushings, and the like. The apparatus and method can be operated and performed by the ordinary workman to produce rapidly, efficiently and in full scale production practices, a rubber torsion unit having the several rubber bodies directly and positively vulcanized to the plurality of metal sleeves without the trapping of air.

While, in accordance with the patent statutes, I have specifically illustrated and described my invention, it should be understood that I am not to be limited thereto or thereby, but that the scope of my invention is defined in the appended claims.

What I claim is:

1. Apparatus for making rubber torsion units, and the like, and including means for supporting a plurality of laterally spaced, concentrically arranged sleeves, means for receiving one kind of rubber, means for forcing said one kind of rubber from said receiving means to a position between certain of the sleeves, and a second means for receiving another kind of rubber, a second means for forcing said other kind of rubber between other of the sleeves, and means for vulcanizing the rubber in position between the sleeves.

2. Apparatus for making rubber torsion units, and the like, and including means for supporting more than two laterally spaced, concentrically arranged sleeves, means for forcing one kind of rubber from a position remote to a position between two of the sleeves, and a second means for forcing another kind of rubber from a position remote to a position between one of the last-mentioned sleeves and another of the sleeves, and means for vulcanizing the rubber in position between the sleeves.

3. A mold for vulcanizing a rubber torsion unit, and the like, and comprising means for surrounding and supporting a relatively short outer metal sleeve, means for interiorly supporting an inner metal sleeve of substantially the same length as the outer metal sleeve and concentric to the outer sleeve, means for positioning a longer sleeve of a diameter substantially intermediate of the inner and outer sleeves between the inner and outer sleeves and concentric thereof and spaced therefrom, means for forcing a body of rubber between the inner sleeve and the intermediate sleeve, and means for forcing a second body of rubber between the intermediate sleeve and the outer sleeve.

4. A mold for vulcanizing a rubber torsion unit, and the like, and comprising means for surrounding and supporting a relatively short outer metal sleeve, means for supporting an inner metal sleeve of substantially the same length as the outer metal sleeve and concentric to the outer sleeve, means for positioning a sleeve of a diameter substantially intermediate of the inner and outer sleeves between the inner and outer sleeves and concentric thereof, and means for forcing rubber between the inner sleeve and the intermediate sleeve, and separate means for forcing rubber between the intermediate sleeve and the outer sleeve.

5. Apparatus for making rubber torsion bushings, and the like, and comprising a mold having an opening receiving and supporting the outer metal sleeve of a bushing, a base removably supporting the mold, a core removably carried at the center of the mold and adapted to support concentrically of the outer sleeve an inner metal sleeve of a bushing, a plunger slidably carried by the core, a second plunger slidably carried between the first-named plunger and the mold, at least one of said plungers having a recess for slidably receiving an intermediate sleeve, and said base being adapted to engage the other end of the intermediate sleeve, said mold being formed with a recess for receiving a body of rubber adapted to be operated on by the said second plunger, and the core being formed with a recess for receiving a body of rubber adapted to be operated on by the first-named plunger.

6. Apparatus for making rubber torsion bushings, and the like, and comprising a mold having an opening receiving and supporting the outer metal sleeve of a bushing, a core carried at the center of the mold and adapted to support concentrically of the outer sleeve an inner metal sleeve of a bushing, a plunger slidably carried between the core and the mold, at least one of said core and plunger elements being formed with a recess for receiving a body of rubber adapted to be operated on by the said plunger upon relative movement between the plunger and the core, and means for vulcanizing the rubber while under the pressure of the plunger.

7. Apparatus for making rubber torsion bushings, and the like, and comprising a mold having an opening receiving and supporting the outer metal sleeve of a bushing, a base mounting the mold, a core carried at the center of the mold by the base and adapted to support concentrically of the outer sleeve an inner metal sleeve of a bushing, a pair of plungers slidably associated with the core and mold, said plungers having a clearance for slidably receiving one end of an intermediate sleeve, said base being adapted to engage the other end of the intermediate sleeve, said mold being formed with a recess for receiving a body of rubber adapted to be operated on by one of said plungers, and the core being formed with a recess for receiving a body of rubber adapted to be operated on by the other of said plungers.

8. That method of making rubber torsion bushings, and the like, which comprises positioning an outer metal sleeve around an inner metal sleeve and in spaced relation therefrom, positioning at least one metal sleeve of intermediate diameter and greater length than the first-named sleeves between the first-named sleeves and so that the intermediate sleeve extends longitudinally beyond the first-named sleeves, engaging a body of rubber against the inner surface of the intermediate sleeve on the portion thereof extending beyond the first-named sleeves, engaging a body of rubber against the outer surface of the intermediate sleeve on the portion thereof extending beyond the first-named sleeves, forcing the rubber bodies under heat and pressure to positions between and in engagement with the several sleeves, vulcanizing the rubber bodies under heat and pressure to the sleeves, and cutting off that portion of the intermediate sleeve extending longitudinally beyond the inner and outer sleeves.

9. That method of making rubber torsion bushings, and the like, which comprises positioning an outer metal sleeve around an inner metal sleeve and in spaced relation therefrom, positioning at least one metal sleeve of intermediate diameter and greater length than the first-named sleeves between the first-named sleeves and so that the intermediate sleeve extends longitudinally beyond the first-named sleeves, forcing rubber under heat and pressure from a remote position to a position between and in engagement with the several sleeves, vulcanizing the rubber under heat and pressure to the sleeves, and cutting off that portion of the intermediate sleeve extending longitudinally beyond the inner and outer sleeves.

10. That method of making rubber torsion bushings, and the like, which comprises positioning at least one metal sleeve of different diameter and greater length concentric to another sleeve and so that the longer sleeve extends longitudinally beyond the other sleeve, engaging a body of rubber against a surface of the longer sleeve extending beyond the shorter sleeve, forcing the rubber body under heat and pressure to a position between and in engagement with the sleeves, vulcanizing the rubber body under heat and pressure to the sleeves, and cutting off that portion of the longer sleeve extending longitudinally beyond the shorter sleeve.

JOHN H. GERSTENMAIER.